(12) United States Patent
Doi et al.

(10) Patent No.: US 7,128,562 B2
(45) Date of Patent: Oct. 31, 2006

(54) MOLDING DIE APPARATUS AND MOLDING METHOD

(75) Inventors: Katsuhiro Doi, Miyagi (JP); Yumiko Aizawa, Miyagi (JP)

(73) Assignee: Sony Corporation, Tokyo (JP)

( * ) Notice: Subject to any disclaimer, the term of this patent is extended or adjusted under 35 U.S.C. 154(b) by 42 days.

(21) Appl. No.: 09/996,518

(22) Filed: Nov. 29, 2001

(65) Prior Publication Data

US 2002/0084545 A1 Jul. 4, 2002

(30) Foreign Application Priority Data

Dec. 1, 2000 (JP) .............................. 2000-367523

(51) Int. Cl.
*B29C 45/63* (2006.01)
(52) U.S. Cl. ...................... 425/546; 425/388
(58) Field of Classification Search ................ 425/546, 425/DIG. 60, 388; 264/1.33, 102
See application file for complete search history.

(56) References Cited

U.S. PATENT DOCUMENTS

| | | | |
|---|---|---|---|
| 4,997,026 A * | 3/1991 | Ozeki et al. ................ 164/305 |
| 5,227,180 A * | 7/1993 | Tisack et al. ................ 425/174 |
| 5,453,000 A * | 9/1995 | Lebensfeld ................ 425/152 |
| 5,603,879 A * | 2/1997 | Osada et al. ................ 264/102 |
| 5,628,944 A * | 5/1997 | Nagasaka et al. ........... 264/46.9 |
| 5,705,201 A * | 1/1998 | Ibar ........................... 425/130 |
| 5,728,129 A * | 3/1998 | Summers ................... 425/215 |
| 5,866,442 A * | 2/1999 | Brand ....................... 438/108 |
| 5,993,189 A * | 11/1999 | Mueller et al. ........... 425/405.1 |

OTHER PUBLICATIONS

Webster's Ninth New Collegiate Dictionary, Merriam-Webster Inc. 1985, p. 274.*

* cited by examiner

*Primary Examiner*—Yogendra N. Gupta
*Assistant Examiner*—Emmanuel S Luk
(74) *Attorney, Agent, or Firm*—Frommer Lawrence & Haug LLP; William S. Frommer

(57) ABSTRACT

A molding die apparatus and a method thereof are provided, which ensures for air and gas (or fluid) present in a resin filling space to be exhausted so as to be able to fill molten resin into the cavity smoothly and uniformly thereby enabling production of a high quality molded resin product suitable as an optical disc substrate or the like having optimum optical properties required therefor. The molding die apparatus for obtaining the molded product by injecting the molten resin into a cavity that is formed between dies includes a vacuum apparatus which is disposed in proximity to the cavity, the vacuum apparatus including a vacuum tank, an exhaustion channel and a vacuum valve which controls open and close of a channel between the vacuum tank and the exhaustion channel, and the cavity is exhausted efficiently and rapidly by the vacuum apparatus.

6 Claims, 5 Drawing Sheets

MOLDING DIE APPARATUS AND MOLDING METHOD

CROSS REFERENCE TO RELATED APPLICATIONS

This application claims priority to Japanese Patent Application No. JP 2000-367523 filed on Dec. 1, 2000, the disclosure of such application being herein incorporated by reference to the extent permitted by law.

BACKGROUND OF THE INVENTION

1. Field of the Invention

The present invention relates to a molding die apparatus and a molding method thereof suitable for molding a resin board for use as an optical disc substrate such as in a compact disc (CD; a trademark), a digital versatile disc (DVD), a magneto-optical disc (MO) and the like, which requires high precision optical properties.

2. Description of the Related Art

As optical discs that can record and reproduce information by means of laser beam irradiation, there have been introduced the compact disc (CD: a trademark), the digital versatile disc (DVD), the magneto-optical disc (MO) and the like.

All of these types of optical discs have a recording portion for recording and reproducing information formed by a functional film such as a recording layer, a reflection layer and the like on a transparent resin substrate. In this case, for example, on one main surface of a disc-shaped transparent resin substrate having pits formed in an irregular pattern corresponding to a designated information signal, there are formed a recording film such as a phase-change film, a vertical magnetization film, and/or a reflection film of aluminum or the like by sputtering, and further a coating protection film is formed thereon.

Such optical disc provided as described above is rotated driven by a spindle motor mounted on a disc table, and reading of its information is enabled by means of an optical pick up apparatus which irradiates a laser beam from the other main surface of the transparent resin substrate and reads out information from its reflected light. Therefore, depending on the optical property of this transparent resin substrate, the reliability and a high speed processing of information are determined. Thereby, an optically homogeneous property is required therefor.

It is necessary for such optical disc substrates having the above-mentioned structure to be suitable for mass production and be fabricated under uniform dimensional precision. Therefore, as shown in FIG. 5, they are manufactured according to the following: melting a resin such as polymethylmethacrylate (PMMA), polycarbonate or the like at heating; injecting a molten resin from an injection molding machine 50 into a resin fill cavity provided within a disc substrate molding die apparatus 51 by a so-called injection molding method; and solidifying by cooling.

The above-mentioned disc substrate molding die apparatus 51 for molding the disc substrate is generally provided with a stationary die 52 and a moving die 53 for forming a cavity therebetween corresponding to a disc substrate. The stationary die member 52 is provided with a stamper for forming a plurality of pits with an irregular pattern that corresponds to a designated information signal on one of the main surfaces of the disc substrate. On the other hand, the moving die member 53 is provided with a read-out surface-forming member for mirror-finishing the other main surface of the disc substrate as an information read-out surface, and a punch for punching a spindle axis support hole in the center of a protruding portion of the optical disc.

When molding the resin substrate by such injection molding method, as molten resin is extruded from a nozzle into a cavity space formed between the die members, if the air in the cavity space is not fully exhausted and resides, it prevents filling of the resin. If filling of the resin is not performed smoothly, there occurs a problem that an optically is not performed smoothly, there occurs a problem that an optically non-homogeneous portion is generated on the molded resin which, if used as it is, would cause a read error, a write error or the like in the optical disc requiring essentially a stringent optical property and, due to deterioration in its bit transfer rate, birefringence and the like its optical property is thereby substantially affected.

Therefore, in order to smoothly exhaust the air in the cavity in the molding dies for molding these optical disc substrates, a countermeasure such as a so-called gas vent or the like is provided so as to exhaust the air and a resin gas emitted from the molten resin and residing in the cavity. However, because of a faster speed of injection of the resin, there arises such a condition in that the molten resin pushes the air out. Thereby, its exhaustion does not fully operate as intended, thereby preventing the filling of the resin and causing defects such as voids and the like trapped in the surface of the substrate due to residual air therein. Further, resin gas emitted from the molten resin filled in the cavity is solidified to clog the gas vent. Thereby, much time has to be spent in maintenance and cleaning the dies.

As to the conventional gas vent method, it is generally practiced that a vent groove is provided along the outer circumference of a product on a portion between parting surfaces of the stationary die and the moving die members and through which the gas is exhausted out of the cavity, or that as shown in FIG. 5, through a piping or a hose 54 which communicates with a vacuum exhausting apparatus 55 provided outside the molding machine, the gas is exhausted outside the cavity by operating the vacuum ON/OFF solenoid valves 57 and the like in response to a signal from a signal cable 56. However, because of a large air flow resistance through a long passage of piping to the vacuum exhausting apparatus 55, there occurs such a problem that its exhaustion rate becomes slow thereby failing to attain a sufficient effect of exhausting. Further, there occur such problems that because of the insufficient filling of the molten resin as well as the solidification of the resin gas therein described above, the optical property of the resultant optical disc is deteriorated, and that the vent tends to be clogged with resin debris.

SUMMARY OF THE INVENTION

The present invention has been contemplated in view of the above-mentioned problems associated with the prior art, and it is preferable to provide a molding die apparatus and a method thereof which ensures that the air and the resin gas in the cavity of a resin filling space in the die be exhausted so that filling of the molten resin into the cavity in the die by injection is carried out smoothly, thereby a resin mold substrate for manufacturing an optical disc having optimum optical properties can be realized effectively.

According to a preferred embodiment of the present invention, a molding die apparatus for obtaining a molded product by injecting a molten resin into a cavity formed between a pair of dies (for example, a stationary die and a moving die opposed to each other) when they are closed, is characterized in that a vacuum apparatus having a vacuum tank is provided in the vicinity of the cavity for efficiently exhausting the cavity by aspiration (depressurization.

According to a molding die apparatus according to another preferred embodiment of the present invention, the above-mentioned vacuum apparatus which is installed inside the die has a structure communicating with a peripheral portion of the cavity and an exhaustion channel connecting between its vacuum tank and the cavity.

Further, preferably, the vacuum apparatus of the molding die apparatus according to another preferred embodiment of the present invention includes a valve mechanism for controlling open/close between the vacuum tank and the exhaustion channel. This exhaustion channel communicates with the peripheral portion of the cavity.

In a molding die apparatus according to still another preferred embodiment of the present invention, the cavity, the exhaustion channel, the combination of the die members, and joint portions communicative with the vacuum tank are sealed and are hermetically sealed.

Further, in the molding die apparatus according still another preferred embodiment of the present invention, the vacuum tank described above is characterized in that it has a volume capacity at least larger than a total (volume) capacity of the cavity and the exhaustion channel.

According to another preferred embodiment of the invention, a molding method is provided for obtaining a molded product by injecting molten resin into the cavity, which is to be formed between a pair of dies when they are closed, comprising: maintaining the vacuum tank provided in the vicinity of the cavity in a vacuum state, i. e., for example, depressurization or, establishing pressure inside the cavity that is lower than surrounding ambient atmospheric pressure; forming the cavity and the exhaustion channel connecting between the cavity and the vacuum tank by closing the pair of dies (the stationary die and the moving die, for example); and immediately before injecting the molten resin, opening the exhaustion channel by means of a valve mechanism so as to ensure for the cavity to be completely exhausted by aspiration (depressurization).

According to the features of the present invention described above implemented by use of the large (volume) capacity vacuum tank provided in the vicinity of the cavity, and by efficient vacuum exhausting of the cavity at a predetermined timing, it is enabled to completely and efficiently exhaust the air from the cavity space thereby minimizing a molding cycle time thereof as well as enabling efficiently carrying out of injection filling of the molten resin. As a result, a molded product having an optimum quality in terms of mechanical and physical properties free from a warp and swell is obtained, which is suitable for use, for example, as an optical disc substrate, and which can substantially improve its optical and mechanical properties such as birefringence, bit signal transfer rate and the like.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DESCRIPTION OF THE PREFERRED EMBODIMENTS OF THE INVENTION

The molding die apparatus and the method thereof according to a preferred embodiment of the present invention will be described in detail with reference to the accompanying drawings.

In this preferred embodiment of the invention, a disc substrate is described to be molded using a transparent resin material such as polycarbonate or the like, however, the disc substrate is not limited thereto, and any optical disc such as a read-only disc, a rewritable magneto-optical disc or the like may be included.

Figure 1:
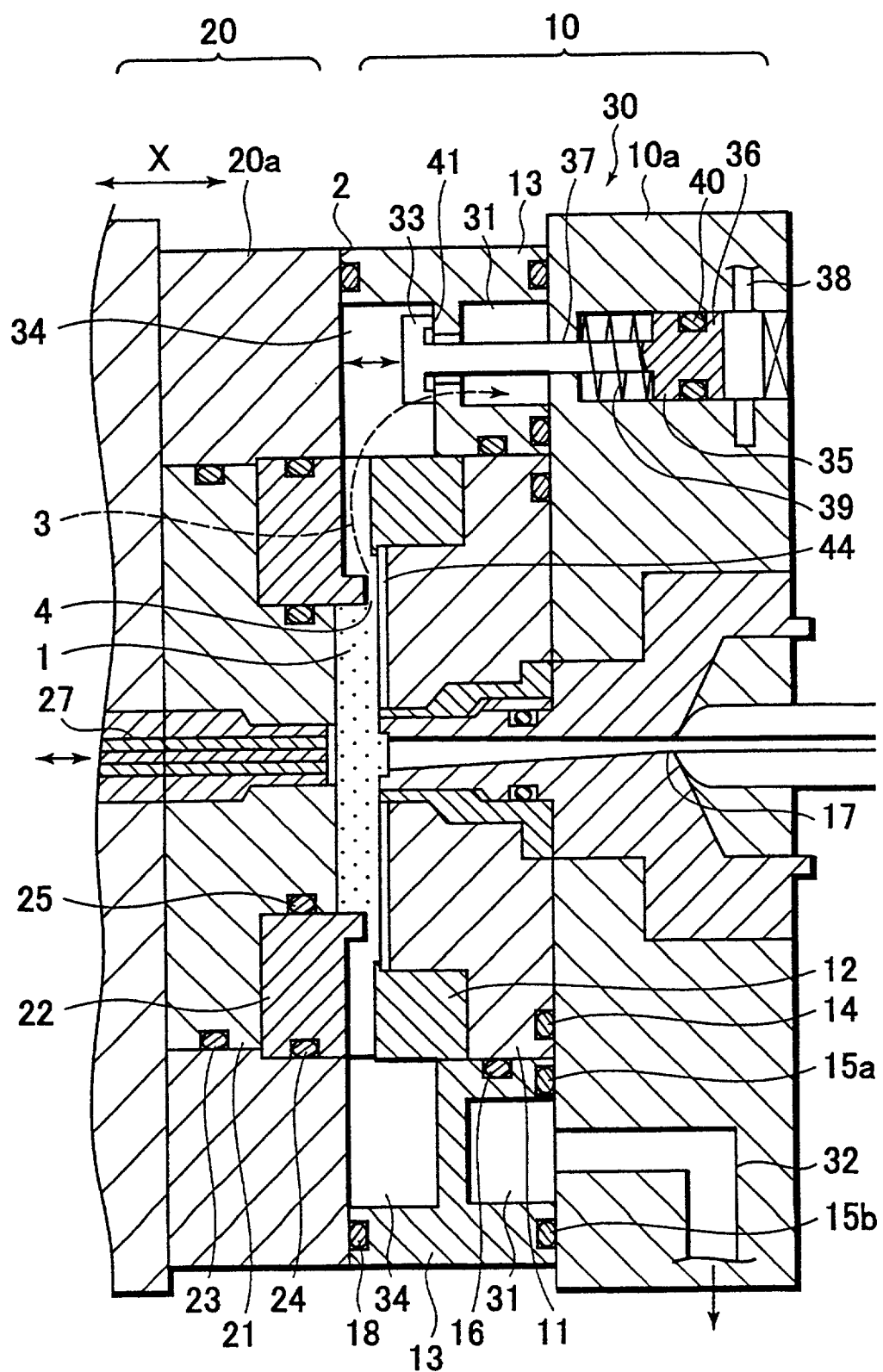
FIG. 1 is a diagram showing a longitudinal cross section of an exemplary construction of a molding die apparatus according to a preferred embodiment of the present invention.

With reference to FIG. 1, an exemplary constitution of the molding die apparatus is shown as a preferred embodiment of the present invention. This molding die apparatus has a stationary die 10 which is fixed on an injection molding machine (not shown) and a moving die 20 which reciprocates in directions indicated by arrows X relative to the stationary die 10, wherein the stationary die 10 and the moving die 20 in combination forms a cavity 1 therebetween when they are closed as shown in the drawing. As it will be described later, a molten resin is injected and filled in the cavity 1 to form a molded product of a disc substrate. After molding, the stationary die 10 and the moving die 20 are opened to separate along a parting line 2.

On the side of the stationary die 10, a mirror plate 11 which constitutes a part of a cavity 1 is jointed, on which a stamper 44 having an irregular pattern of pits and grooves formed thereon corresponding to information signals is mounted. On an edge portion of the mirror plate 11 there is jointed a die member 12, which firmly holds a peripheral portion of the stamper 44 and also constitutes an exhaustion channel 3 to be described later (indicated by a dotted line arrow). This die member 12 is disposed approximately in a ring pattern such as to surround the circumference of the cavity 1. Further, on an external portion of the die member 12 there is jointed a die member 13 for installing a vacuum tank and the like of the vacuum apparatus therein, which will be described later.

Further, on the side of the moving die 20, a mirror plate 21 that constitutes the other part of the cavity 1 is jointed. On the edge portion of the mirror plate 21 there is jointed a die member 22 which forms in combination with its mating part the exhaustion channel 3 to be described later. This die member 22 is disposed approximately in a ring pattern such as to surround the periphery of the cavity 1. Further, the die member 22 forms a circumferential portion of the cavity 1 and also a gas vent 4 between the mirror plate 11 of the stationary die 10.

The above-mentioned gas vent 4 is formed along the circumference of the cavity 1, which may be formed either continuously along the whole peripheral portion of the cavity 1 or intermittently therealong. The gas vent 4 allows the cavity 1 to communicate with the exhaustion channel 3. A gap size of the gas vent 4 is set preferably in a range of 0.05 mm to 0.02 mm. By setting this gap size appropriately, it is enabled to pass only the air but to stop a resin material or the like having a high viscosity.

Here, although the die apparatus according to the present invention is comprised of a plurality of die members or split die members, all of the cavity 1, the exhaustion channel 3, the combination of the die members and joint portions communicating with the vacuum tank are hermetically sealed by a number of sealing means. In this exemplary case, an O-ring 14 is inserted as seal means between the stationary die member 10a and the mirror plate 11, O-rings 15a and 15b are inserted between the stationary die member 10a and the die member 13, and an O-ring 16 is inserted between the mirror plate 11 and the die member 13 for airtight sealing, respectively.

Further, an O-ring 23 is inserted between the moving die member 20a and the mirror plate 21, an O-ring 24 is inserted between the moving die member 20a and the die member 22, and an O-ring 25 is inserted between the mirror plate 21 and the die member 22, respectively. Still further, an O-ring 18 is inserted between the die member 13 of the stationary die 10 and the moving die member 20a for hermetically sealing.

In the center portions of the stationary die member 10a and the mirror plate 11, a resin injection nozzle 17 communicating with the cavity 1 is disposed. This resin injection nozzle 17 allows for a synthetic molding resin material such as polycarbonate molten resin or the like supplied from an injection machine (not shown) to be injected to fill in the cavity 1. In the center portion of the moving die 20 there is supported a punch 27 movable relative to the cavity 1. This punch 27 is driven by a driving mechanism (not shown) to protrude into the cavity 1 at a predetermined timing so as to form a center hole or a spindle hole, for example, in a disc substrate having been molded.

Now, in the molding die apparatus according to the preferred embodiment of the present invention, the vacuum apparatus 30 having the vacuum tank 31 is provided in proximity with the cavity 1, and by means of this vacuum apparatus 30, the air inside of the cavity 1 is efficiently exhausted by aspiration (depressurization).

The vacuum tank 31 is disposed inside the die, namely, in this instance, within the die member 13 as shown in FIG. 1. This vacuum tank 31, which is arranged to communicate with the cavity 1 via the exhaustion channel 3, is constructed as a space approximately of a ring-form which is arranged in a peripheral portion of the cavity 1. Further, in contact with this vacuum tank 31, a vacuum circuit 32, which is connected to a vacuum source such as a large capacity vacuumexhaustion equipment provided as a factory facility, is formed in the stationary die member 10a. Thereby, the vacuum tank 31 connected to this vacuum circuit 32 is maintained constantly in a vacuum (or vacuum-like or, low pressure) state.

As described above, the exhaustion channel 3 is communicating with the circumferential portion of the cavity 1 via the gas vent 4, however, in the state of FIG. 1, its channel leading to the vacuum tank 31 is interrupted by a vacuum valve, which will be described later. This vacuum tank 31 has a larger (volume) capacity at least than a total capacity of the cavity 1 and the exhaustion channel 3. The larger the (volume) capacity of the vacuum tank 31, the more preferable the vacuum tank 31 is in order to ensure for an effective vacuum exhausting function to be achieved with respect to the cavity 1. However, it should be determined within an allowable range of sizes, spaces or the like of the die apparatus.

With reference to FIG. 1, the vacuum valve 33 is supported movably to reciprocate in directions indicated by arrows in a space 34 within the die member 13, which constitutes the exhaustion channel 3. In this example, a piston 36, which reciprocates in a cylinder 35 formed within the stationary die member 10a, is connected to the vacuum valve 33 via a piston rod 37. Within the stationary die member 10a, an air circuit 38, which is connected to a compressed air source (not shown) is formed. By supplying a compressed air to this air circuit 38, the piston 36 is driven toward the moving die 20 against resilience of a spring 39. By this motion of the piston 36, the vacuum valve 33 is opened so as to allow for the exhaustion channel 3 to communicate with the vacuum tank 31. Also, in this instance, an O-ring 40 is inserted between the stationary die member 10a and the piston 36, and an O-ring 41 is inserted between the vacuum valve 33 and the die member 13 so as to ensure for the hermetically sealed condition to be maintained. These vacuum valve 33, piston 36 and the like that constitute in combination the valve mechanism for communicating between the vacuum tank 31 and the exhaustion channel 3 may be provided in a plural number on the side of the stationary die.

By the way, the air circuit 38 is arranged to be supplied with the compressed air at a predetermined timing. When this compressed air is released, the piston 36 returns to its original position by the resilience of the spring 39.

Now, with reference to FIG. 2, FIG. 3 and FIG. 4, steps of molding procedures for obtaining molded products such as optical disc substrates by means of the above-mentioned molding die apparatus embodying the invention will be described below.

Figure 2:
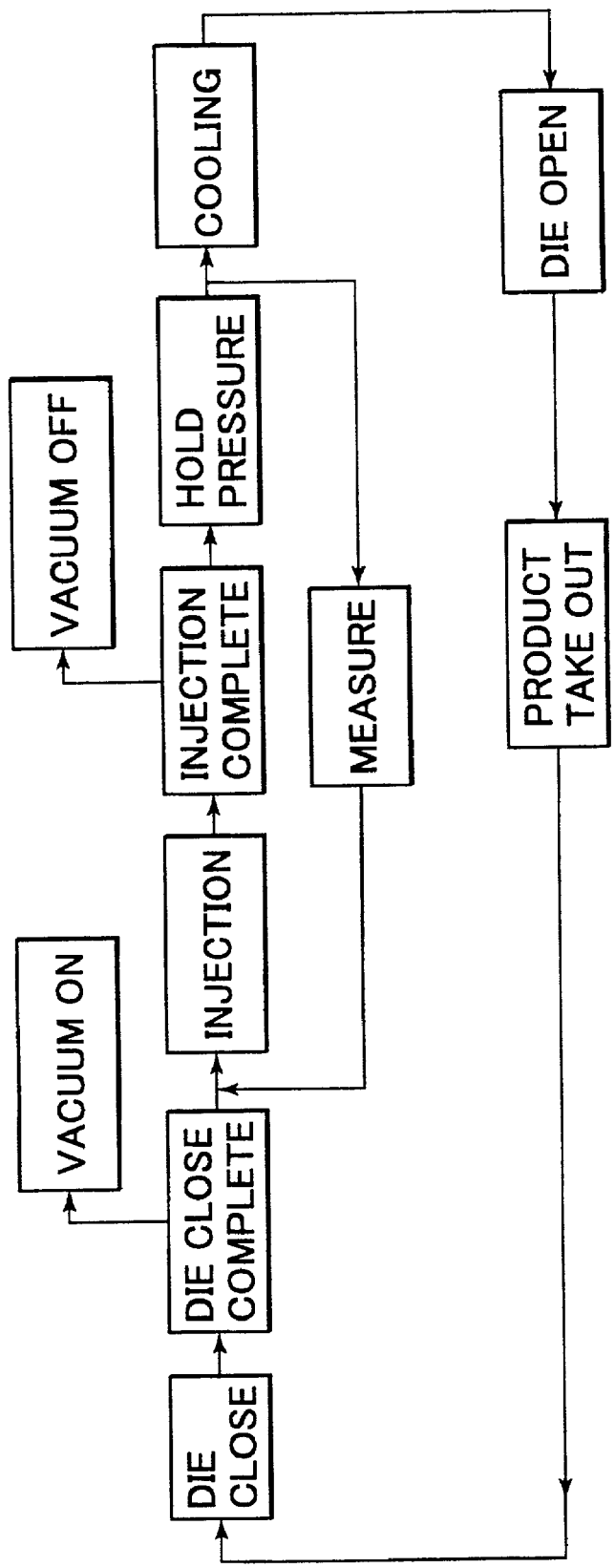
FIG. 2 is a block diagram showing main processes of operation in the molding die apparatus according to a preferred embodiment of the present invention.
Figure 3:
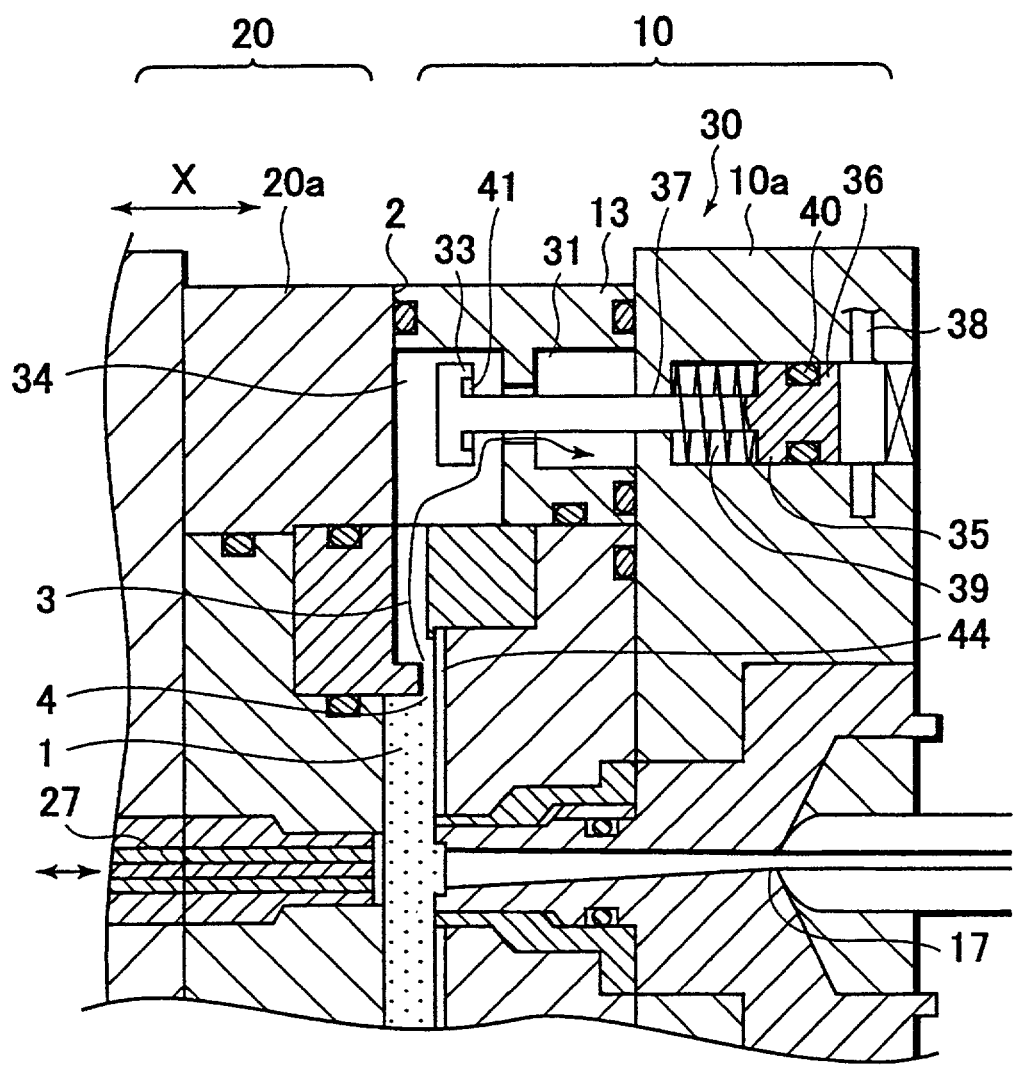
FIG. 3 is a cross-sectional diagram showing a state of the molding die apparatus in part at the time of injecting the molten resin according to a preferred embodiment of the present invention.

FIG. 2 illustrates main processes for molding the optical disc substrate by operation of the molding die apparatus of the invention, and FIG. 3 illustrates a longitudinal cross-sectional partial view of the molding die apparatus injecting a molten resin.

At first, the moving die 20 is moved toward the stationary die 10 by its closure operation until they make press-contact as shown in FIG. 1, whereby the die apparatus is closed. At this instant of the die closure, although the cavity 1 is formed between the mirror plate 11 of the stationary die 10 with a stamper 44 mounted thereon and the mirror plate 21 of the moving die 20, the exhaustion channel 3 is not yet communicating with the vacuum tank 31 as it is interrupted by the vacuum valve 33.

Subsequently, after the die close, a molten resin is injected into the cavity 1. However, according to the invention, immediately prior to its resin injection, vacuum exhausting of the cavity 1 is carried out. Namely, at nearly the same time as the completion of the die close, the vacuum valve 33 of the vacuum apparatus 30 is operated to open the exhaustion channel 3. In this instance, as described above, the compressed air is supplied to the air circuit 38 so as to drive the piston 36 toward the moving die 20 against the resilience of the spring 39. Thereby, the vacuum valve 33 is opened as shown in FIG. 3 so as to enable for the exhaustion channel 3 to communicate with the vacuum tank 31.

Upon opening of the exhaustion channel 3, the cavity 1 is communicated with the vacuum tank 31. The vacuum tank 31, which is connected to the vacuum source, is constantly maintained in a state of high vacuum condition and is capable of starting a strong vacuum suction simultaneously to the opening of the exhaustion channel 3. Air in the cavity 1 is exhausted through the gas vent 4 and a gap of the vacuum valve 33 to the vacuum tank 31 as indicated by an arrow in FIG. 3. As described above, the air inside of the cavity 1 can be exhausted by aspiration through the exhaustion channel 3.

Advantageously, because the vacuum tank 31 according to the present invention is disposed in close proximity to the cavity 1, it is enabled to complete its vacuum exhausting very efficiently and in a very short period of time.

Further, advantageously, in the die apparatus of the present invention, because the cavity 1, exhaustion channel 3 and the coupling and/or joint portions of the die members communicating with the vacuum tank 31 are sealed with O-rings and maintained hermetic, the vacuum condition is prevented from leaking during the vacuum exhausting. Thereby, by addition of this feature alone, a strong vacuum exhausting, or exhaustion by aspiration,can be realized.

As described above, a degree of vacuum in the cavity 1 is substantially increased prior to starting the resin injection. Here, the principle of operation of the vacuum apparatus 30 according to the invention will now be described The vacuum apparatus 30 of the present invention is characterized by installing its vacuum tank 31 as the vacuum suction source for vacuum exhausting inside the cavity 1 within the stationary die 10. Conventionally, as shown in FIG. 5, the air inside the cavity 1 is exhausted directly through a long vacuum hose 54 or a vacuum piping connected to a vacuum generation apparatus 55 provided at factory facilities or the like.

Figure 5:
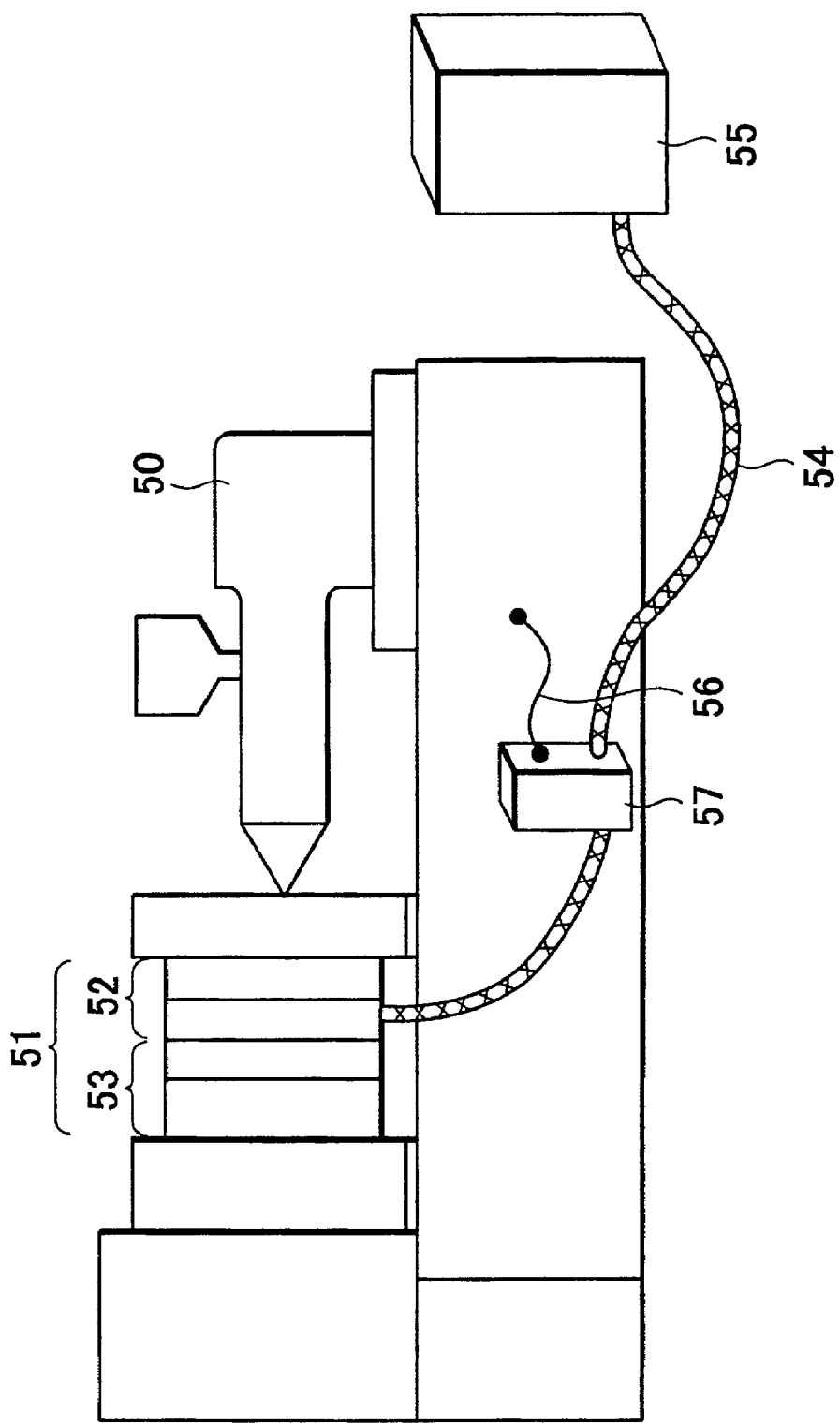
FIG. 5 is a schematic diagram showing a conventional molding die apparatus.

In the conventional apparatus shown in FIG. 5, in addition to an exhaustion resistance of the exhaustion channel in the molding die, an exhaustion resistance of the vacuum hose 54 is added to. Assuming each exhaustion conductance of the exhaustion channel in the die apparatus and of the vacuum hose 54 to be C1 and C2, respectively, each exhaustion resistance of the exhaustion channel and the vacuum hose 54 will be given by 1/C1 and 1/C2, thereby, an amount of exhaustion flow Q' ($m^3 \cdot Pascal \cdot S^{-1}$) of cavity 1 after the vacuum on-off solenoid valve 57 is turned on is represented by the following equation (1):

$$Q'=C1(Pa-Pt)/(C1/C2+1) \qquad (1),$$

where, Pa is a degree of vacuum in the cavity 1, and Pt is a degree of vacuum in the vacuum generation apparatus 55. Immediately after turning-on of the vacuum on-off solenoid valve 57, Pa is an atmospheric pressure and Pt is an attainable degree of vacuum in the vacuum generator apparatus 55.

A conductance C in a viscous flow is given by the following equation (2):

$$C=A \cdot d^4 \cdot Pm/L \ (m^3/s) \qquad (2),$$

where, A is a constant, d is a diameter of the exhaustion channel, L is a length of the exhaustion channel, and Pm is a mean pressure in the exhaustion channel. The vacuum hose 54 because it must be connected to the vacuum exhausting apparatus 55 has a long length of L. As clearly known from equation (2), conductance C2 becomes smaller, that is, exhaustion resistance 1/C2 increases. Therefore, in the prior art apparatus, the exhaustion flow Q' from the cavity 1 is decreased by its exhaustion resistance 1/C2, thereby prolonging its exhaustion time required for exhausting the cavity 1.

Figure 4:
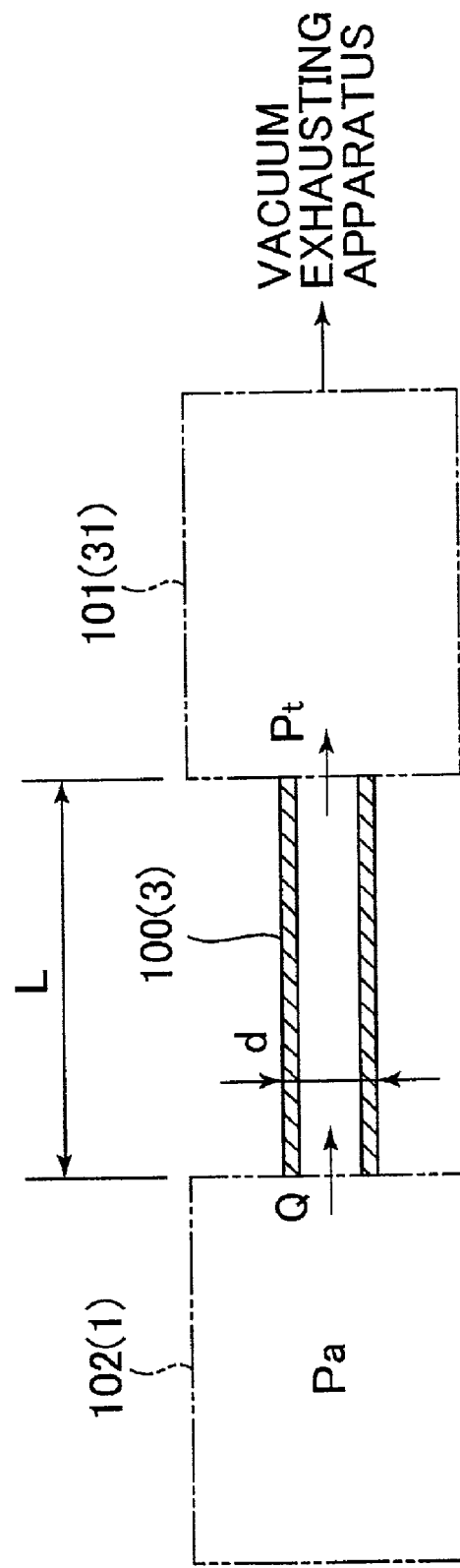
FIG. 4 is a diagram modeling the principle of operation of the molding die apparatus according to a preferred embodiment of the present invention.

FIG. 4 is a block diagram indicating a model of the exhaustion flow in the vacuum apparatus 30 of the invention. In FIG. 4, numeral 102 depicts the cavity 1, and numeral 100 depicts the exhaustion channel 3 schematically. Further, 101 schematically depicts the vacuum tank 31 as the vacuum (aspiration) source. This modeling diagram shows a state in which the vacuum tank 101 is exhausted to its maximum degree of vacuum attainable in advance, and immediately after the vacuum valve 33 (with reference to FIG. 3) is opened.

In this vacuum apparatus 30 according to the invention, advantageously, the vacuum tank 101 (31) is provided in a close proximity to the cavity 1, and this vacuum tank 101 (31) is exhausted in advance to its maximum degree of vacuum attainable. The exhaustion flow Q from the cavity 1 after the vacuum valve 33 is opened is given by the following equation (3):

$$Q=C1(Pa-Pt) \qquad (3),$$

where, Pa is a degree of vacuum in the cavity 1, and Pt is a degree of vacuum in the vacuum tank 101 (31). Immediately upon the opening of the vacuum valve 33, Pa is an atmospheric pressure and Pt is the degree of vacuum attainable in the vacuum tank.

As clearly known from equation (3), the exhaustion flow Q from the cavity 1 in the vacuum apparatus 30 according to the invention can be substantially increased in comparison with that of the prior art because that the exhaustion resistance 1/C2 of the conventional vacuum hose 54 is eliminated, and that the vacuum tank 101 (31) of the invention is disposed in close proximity to the cavity 1, thereby minimizing its exhaustion resistance (1/C1) of the exhaustion channel 100 (depicted by numeral 3 in FIG. 3).

Further, because the pressure Pt in the vacuum tank 101 (31) increases with elapse of time after the opening of the vacuum valve 33, a pressure difference (Pa–Pt) decreases. When the pressure difference (Pa–Pt) decreases, as shown in equation (3), the exhaustion flow Q is reduced. However, by setting the capacity of the vacuum tank 101 (31) as large as possible, the increase of Pt can be suppressed to a minimum level so as to enable the required exhaustion flow Q to be secured.

That is, according to the vacuum apparatus 30 of the present invention, there can be accomplished such advantages that a large exhaustion flow is obtained, the vacuum exhausting of the cavity 1 can be carried out very efficiently, its molding cycle time can be shortened substantially due to the large exhaustion flow, and that the injection filling of the resin into the cavity can be carried out smoothly.

Still further, the vacuum tank 31 in the molding die apparatus of the invention is enabled to have a larger capacity at least than a total capacity of the cavity 1 and the exhaustion channel 3. By securing the large capacity greater than a predetermined value for the vacuum tank 31 as described above, it is enabled to carry out an optimum and stable vacuum exhausting.

For example, assume here a specific case in which a ratio of capacities between the vacuum tank 31 and a subtotal of the cavity 1 and the exhaustion channel 3 is one to one (1:1). Further, in this case, a degree of vacuum in the cavity 1 when injecting the molten resin into the cavity 1 is assumed to be approximately 0.05 Mpa as its target value.

If the degree of vacuum in the vacuum tank 31 is 0.025 Mpa, a total capacity becomes twice when the exhaustion channel is opened. In this instance, on the basis that PV is constant (P is the pressure, and V is the volume), the target degree of vacuum of 0.05 Mpa can be obtained in the cavity 1.

In practice, however, because the vacuum tank 31 is connected to the vacuum exhausting apparatus 55 and is being exhausted constantly, it is enabled for the cavity 1 to be exhausted to a sufficiently high level of vacuum greater than expectable by the above-mentioned increased capacity effect.

Following the above-mentioned vacuum exhausting of the cavity 1, the process of the injection molding is started. In this case, molten synthetic resin material supplied from an injection machine (not shown) is injected through a resin injection nozzle 17 and filled in the cavity 1. The synthetic resin material injected from the nozzle expands in the space of the cavity 1 and fills the inside of the cavity 1. During the process of this injection and filling of the synthetic resin material, the vacuum apparatus 30 keeps operating to continue the above-mentioned vacuum exhausting. Thereby, the injected resin can be filled in the cavity 1 smoothly, uniformly and in a reduced period of time.

After completion of injection of the synthetic resin material, when the supply of compressed air to the air circuit 38 is stopped, the piston 36 returns to its initial position by resilience of the spring 39. Thereby, the vacuum valve 33 is closed so as to interrupt the exhaustion channel 3.

After interruption of the exhaustion channel 3, injection pressure is maintained for a predetermined period of time and, then, the molten resin is measured in preparation for a next shot. In this instance, the exhaustion channel 3 is kept interrupted, and a preset degree of vacuum is restored.

Subsequently, a molded disc substrate is cooled by means of a respective cooling apparatus (not shown) provided within the stationary die 10 and the moving die 20. After completion of cooling, the dies are opened so as to take out the disc substrate of the molded product thereby completing the molding cycle for one shot.

As described above, in the die apparatus according to the preferred embodiment of the present invention, by provision of the vacuum tank 31 having the designated capacity in close proximity to the cavity 1, it is possible to carry out the vacuum exhausting of the cavity 1 very efficiently and in a very short period of time. In this instance, by increasing the degree of vacuum in the cavity 1 immediately prior to the injection of the molten resin by carrying out its vacuum exhausting, the cycle time required for the molding process can be substantially reduced.

Although the present invention having been described in its preferred form with a certain degree of particularity, obviously many changes, variation and combinations are possible. It is therefore to be understood that any modifications will be practiced otherwise than as specifically described herein without departing from the scope of the present invention.

For example, the mirror plates 11 and 21, or the die members 12, 13, 22 and the like are not limited in their forms and numbers to those specifically described above, and may be modified appropriately. Further, although the vacuum apparatus 30 is described by way of example as disposed on the side of the stationary die 10, it may be disposed on the side of the moving die 20 as well if allowable in sizes, dimensions or the like.

Also, although the preferred embodiments of the present invention being described here by reference to a pair of dies, it is allowable to provide a set of more than two dies regardless of the way they are fixed or moved so as to constitute, when closed, a cavity (or cavities) for molding.

Still further, although the invention is described as applied to the molding of an optical disc substrate, it is not limited thereto, the invention is also applicable to manufacturing any other molding products to have similar effects and advantages.

As described hereinabove, by use of the vacuum tank having comparatively large capacity in this type of molding die apparatus and by vacuum exhausting the cavity by means of this vacuum tank which is disposed in close proximity to the cavity at the designated timing according to the present invention, an optimum and smooth injection of the resin is accomplished. As a result, a high quality optical disc substrate having optimum mechanical and physical properties is obtained, which can substantially improve its optical property such as birefringence, bit signal having been injected can be removed fast and thoroughly, adhesion and/or clogging of the resin gas within the die can be minimized, thereby prolonging the die maintenance cycle.

What is claimed is:

1. A molding die apparatus for obtaining a unitary molded disc-shaped product by injecting molten resin into a cavity formed when closing a set of dies, the apparatus comprising:
a vacuum apparatus including a vacuum tank disposed within said die apparatus in close proximity to said cavity and circumferentially above said cavity; and
exhaustion means connecting said vacuum tank to said cavity for exhausting air and/or fluid directly from said cavity by said vacuum apparatus,
wherein said vacuum apparatus communicates with a circumferential, portion of said cavity through said exhaustion means.

2. The molding die apparatus according to claim 1, wherein said vacuum apparatus includes a valve mechanism for controlling opening and closing of passage between said vacuum tank and said exhaustion means.

3. The molding die apparatus according to claim 1, wherein said vacuum tank has volume capacity at least larger than a total volume capacity of said cavity plus said exhaustion means.

4. A molding die apparatus for obtaining a unitary molded disc-shaped product by injecting molten resin into a cavity formed when closing a set of dies, the apparatus comprising:
a vacuum apparatus including a vacuum tank disposed within said die apparatus in close proximity to said cavity and circumferentially above said cavity, and
an exhaustion channel connecting said vacuum tank to said cavity for exhausting air and/or fluid by said vacuum apparatus directly from said cavity,
wherein said vacuum apparatus communicates with a circumferential portion of said cavity through said exhaustion channel.

5. The molding die apparatus according to claim 4, wherein said vacuum apparatus includes a valve mechanism for controlling opening and closing of passage between said vacuum tank and said exhaustion channel.

6. The molding die apparatus according to claim 4, wherein said vacuum tank has volume capacity at least larger than a total volume capacity of said cavity plus said exhaustion channel.

* * * * *